UNITED STATES PATENT OFFICE.

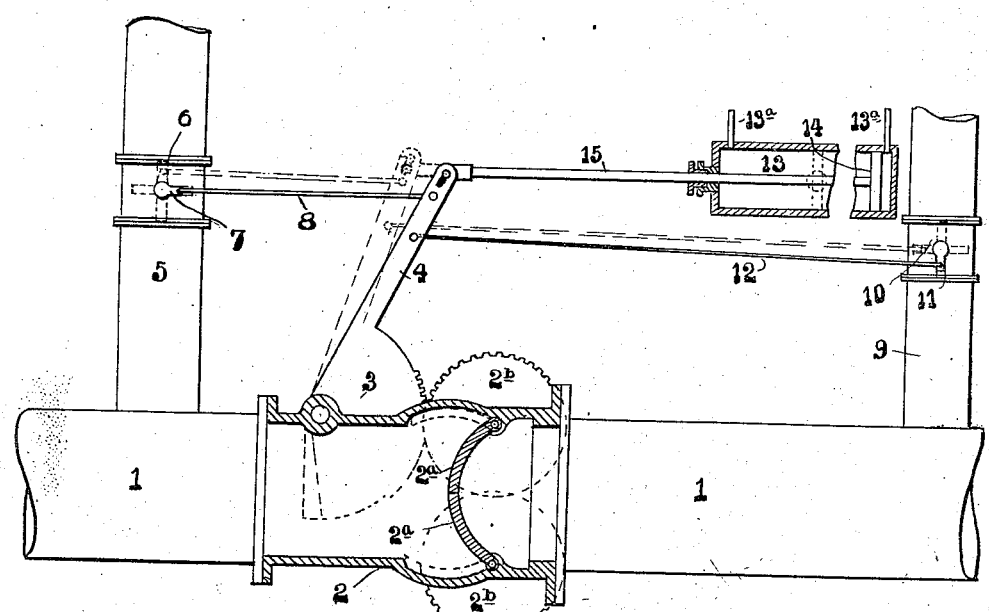

WILLIAM COOPER, OF DENVER, COLORADO.

VALVE.

SPECIFICATION forming part of Letters Patent No. 715,758, dated December 16, 1902.

Application filed January 4, 1902. Serial No. 88,434. (No model.)

*To all whom it may concern:*

Be it known that I, WILLIAM COOPER, a citizen of the United States of America, and a resident of the city of Denver, county of Arapahoe, State of Colorado, have invented certain new and useful Improvements in Valves, of which the following is a specification.

In the drawing the view shown is an elevation of my invention.
My invention, generally speaking, consists in a new and improved valve for steam or power lines and kindred uses.

In the use of a simple cut-off valve in a line conveying steam or other power from a boiler or compressor to an engine great danger attends the sudden closing or partial closing of the valve cutting off the supply of power from the engine. The closing of the valve, while it causes a reduction of the pressure in the line between valve and engine, on the other hand causes a sudden and considerable rise in pressure in the line between the source of power and the valve. The safety-valve in a steam-boiler takes care of the increased pressure at the boiler; but before the elasticity of the steam can distribute the suddenly-increased pressure in the line caused by closing or partially closing the valve in the steam-line, and thus halting the moving column of steam, the pipe has been subjected to a violent wrench, resulting frequently in ruptures attended by diastrous results. This is especially true when the engines are some distance from the boiler, as in rolling-mills and large ocean vessels, where steam-lines two or three hundred feet long are not unusual. In such cases the column of steam by the time it has reached the valve in the steam-line has lost some of its elasticity, and therefore a sudden increase in pressure is not so quickly distributed, but exerted to a large degree directly against the line at the valve. To remedy these objections and dangers, I have invented an improved valve device by means of which upon cutting off or reducing the power from the engine at the same time and by the same operation the pressure is proportionately relieved in the steam-line back of the valve, so that no sudden rise results. This I effect by exhausting a portion of the steam in the space back of the stop-valve, or I may do away with a direct stop-valve in the line and control the supply of power to the engine by an exhaust-valve in the line, by opening or shutting which I regulate both the steam-supply at the engines and prevent any such sudden increase of pressure in the steam-line. The capacity of such exhaust will be preferably less than that of the steam-line, so that even when the exhaust is entirely open the boiler-pressure will not be seriously affected.

Insomuch as the closing of the stop-valve in the steam-line alone will not relieve the pressure in the portion of the steam-line between the stop-valve and the engines, so that the engines will still operate until such pressure is utilized, I provide an exhaust for that portion of the steam-line which is operated in conjunction with the stop-valve in like manner as the exhaust for the other sections of the steam-line is operated thereby, so that upon the closing, or partially closing, of the stop-valve this last-mentioned exhaust is proportionately partly or entirely opened, as the case may be, so that the pressure is relieved in that portion of the steam-line and the pressure of steam or power on the engine-cylinders is partly or entirely removed, and therefore the engines respond quickly to the operation of the stop-valve.

The following is a detailed description of my invention, reference being had to the drawing which makes part of this specification.

1 is a steam or power line, the boilers or power-generating plant being supposed in the drawing to be to the left, while the engines are to the right. In the line 1 I place valve 2, which regulates the supply of power to the engines. I have shown a shutter-valve of usual construction at this point as being among the most suitable forms of valves; but a plug-valve or valve of any design found convenient may be substituted.

2ª 2ª are the valve-shutters, which are operated in the usual manner by gears 2ᵇ 2ᵇ, which are in turn operated by gear 3, journaled on the steam-line and provided with arm 4.

5 is an exhaust leading out from the steam-line between the boilers and the valve 2, adjacent to said valve. In exhaust 5 is valve 6, which may be of any convenient design, though I have shown a simple form for the sake of clearness. Valve 6 is provided with arm 7, which is operatively connected with arm 4 by rod 8. On the steam-line 1, between stop-valve 2 and the engines, I place a second exhaust 9, provided likewise with valve 10, of any convenient design. Valve 10 is provided with arm 11, connected to arm 4 by rod 12.

13 is a cylinder operated by air or other convenient power, provided with connections 13ª 13ª for the alternate admission of power. These connections 13ª 13ª are led to a two-way valve or other suitable throttle (not shown) which controls the admission of power to the cylinder and is operated by hand or other means, as desired, such as some automatic device.

14 is a piston reciprocating in the cylinder 13 and provided with rod 15, which is connected at its outer end with arm 4 by a slotted connection. It will thus be seen that the reciprocation of piston 14 in cylinder 13 actuates arm 4, and thus operates valves 2, 6, and 10. In the drawing valve 2 is shown closed and exhaust-valves 6 and 10 open. Arms 8 and 12 are so assembled with valve-arms 7 and 11 that when valve 2 is open valves 6 and 10 are closed and when valve 2 is closed valves 6 and 10 are open, and consequently a partial closing of valve 2 will result in a proportionately partial opening of valves 6 and 10.

The operation of my device is as follows: Supposing valve 2 to be open and full power being admitted through the line to the engines, when it is desired to quickly cut off the power from the engines, as in cases of emergency, by means of the throttle on cylinder 13 the air is admitted in said cylinder through the proper connection 13ª, so as to force the piston 14 from the position shown by dotted lines to that shown by the full lines in the drawing, thus by means of rod 15 drawing back arm 4 from the position shown by the dotted lines to that shown by the full lines. This correspondingly rotates partial gear 3, thus rotating the shutters 2ª 2ª from their open position, as shown by dotted lines, to their closed position. (Shown by full lines in the drawing.) The operation so far cuts off the steam or power from the engines. The movement of arm 4 will result, as has been shown, in opening of valve 6, thus allowing the increased pressure in the line 1 between valve 2 and the source of power to escape through exhaust 5, thus relieving this portion of line 1 of the sudden rush of increased pressure attendant on closing valve 2. Arm 4 also in this operation opens exhaust-valve 10, thus reducing the pressure in the line 1 between valve 2 and the engines, so that the engines respond more quickly to the operation of valve 2. It is often desirable to partially close valve 2 to reduce the amount of power applied to the engines, and in such case the valve 6 would be partially opened, thus taking care of the proportionate rise of pressure in the line 1 between valve 2 and the source of power. The exhaust-valve 10 would also be proportionately opened by the same operation, thus enabling the engines to more quickly respond to the partial closing of stop-valve 2.

From the above it will be at once seen that my invention provides simple and effective means for both controlling the supply of power to driving mechanism and at the same time insuring the power-line against dangerous strains and wrenches arising from the operation of the stop-valve, especially in cases of emergency. I also insure more prompt response on the part of the engines to the operation of the stop-valve. I may, however, do away with stop-valve 2 and control both the supply of steam to the engines and the pressure on the steam-line by the opening and closing of exhaust-valve 6. In this case exhaust 9 may be done away with.

I have shown my invention as more particularly applied to the use of steam; but in the use of any power under pressure my improved valve arrangement will be found of great advantage. I have explained that my device may be controlled by hand, which is the method usual in such cases; but any device may be provided to control the reciprocation of piston 14, such as connection with a governor or other automatic controller.

My improved valve is especially useful in connection with an automatic controller for ship-propellers, where said valve is controlled by the sea. It will thus be seen that my invention is of great utility and may be utilized in manifold ways.

Although I have described my invention with minuteness, I do not intend to limit myself thereby, but claim, broadly—

In controller-valves; the combination of a power-line; a stop-valve in said power-line; an exhaust-valve in said power-line between the source of power and said stop-valve, and a second exhaust-valve in said power-line on the opposite side of said stop-valve, both of said exhaust-valves being operatively connected with said stop-valve.

Signed by me at Pittsburg, Pennsylvania, this 30th day of December, 1901.

WILLIAM COOPER.

Witnesses:
EDWARD A. LAWRENCE,
J. BOYD DUFF.